US009252940B2

(12) United States Patent
Chen

(10) Patent No.: US 9,252,940 B2
(45) Date of Patent: Feb. 2, 2016

(54) PHASE TRACKING FOR A SAMPLING CLOCK

(71) Applicant: Intel Corporation, Santa Clara, CA (US)

(72) Inventor: Huimin Chen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/186,683

(22) Filed: Feb. 21, 2014

(65) Prior Publication Data

US 2015/0244512 A1   Aug. 27, 2015

(51) Int. Cl.
*H03D 3/24* (2006.01)
*H04L 7/00* (2006.01)
*H04W 56/00* (2009.01)

(52) U.S. Cl.
CPC ............ *H04L 7/0012* (2013.01); *H04L 7/0054* (2013.01); *H04W 56/0015* (2013.01)

(58) Field of Classification Search
CPC ..... H04L 7/0337; H04L 7/0334; H04L 7/033; H04L 7/0029; H04L 7/0008; H04L 7/02; H04L 7/0331; H03L 7/091

USPC .......................... 375/355, 354, 219, 316, 295
See application file for complete search history.

(56) References Cited

U.S. PATENT DOCUMENTS

2005/0069041 A1*  3/2005  Lincoln .......................... 375/257
2011/0235459 A1*  9/2011  Ware et al. ................ 365/233.11

* cited by examiner

*Primary Examiner* — Zewdu Kassa
(74) *Attorney, Agent, or Firm* — International IP Law Group, P.L.L.C.

(57) ABSTRACT

Techniques for sampling a data signal are described. An example of an electronic device includes a data bus, a transmitting device coupled to the data bus, and a receiving device coupled to the data bus by a bus interface. The bus interface is to receive a data signal from the transmitting device, wherein the data signal includes a known data pattern. Additionally, the bus interface is to receive a forwarded clock signal from the transmitting device and generate a sampling clock signal based on the forwarded clock signal. Additionally, the bus interface is to sample the known data pattern to obtain phase tracking data and adjust a sampling phase of the sampling clock signal based on the phase tracking data.

20 Claims, 5 Drawing Sheets

300

PHASE TRACKING FOR A SAMPLING CLOCK

TECHNICAL FIELD

This disclosure relates generally to techniques for sampling a data transmission. More specifically, the disclosure describes phase tracking techniques for adjusting a sampling clock at a receiving device of an Input/Output (I/O) interconnect based on a forwarded clock from a sending device.

BACKGROUND

Various types of I/O interconnect protocols use a clocking technique referred to as forwarded clocking. In forwarded clocking, a clock signal is transmitted from a sending device to a receiving device along with a data signal. The forwarded clock signal enables the receiving device to synchronize with the transmitting device, enabling the receiving device to accurately sample the data signal transmitted by the sending device.

DETAILED DESCRIPTION

Figure 1:
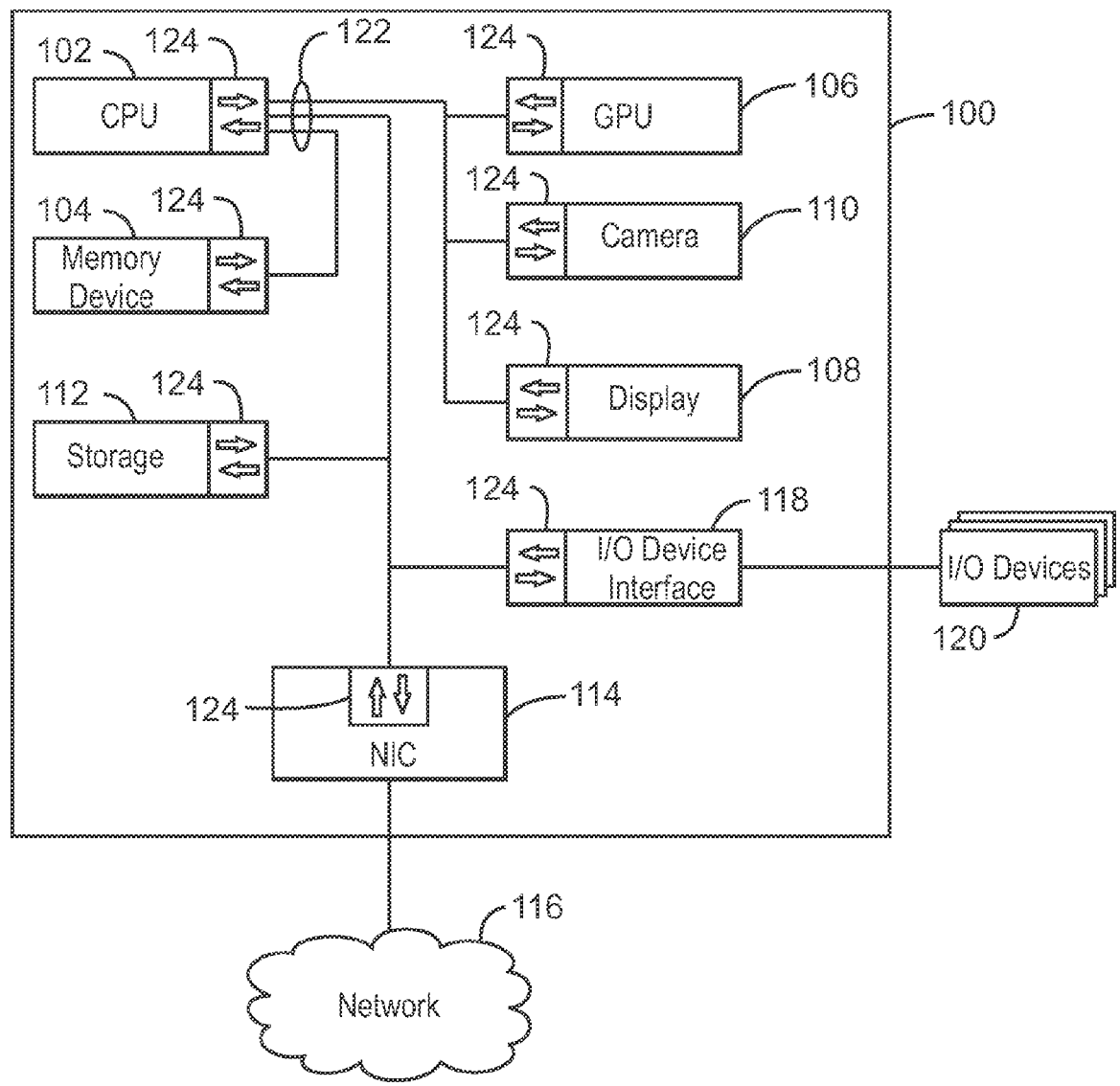
FIG. 1 is a block diagram of an example computing device with a bus interface that uses the phase tracking technique described herein.

The subject matter disclosed herein relates to techniques for calibrating a sampling clock in an I/O interconnect that uses forwarded clocking. In forwarded clocking, a clock signal is transmitted from a sending device to a receiving device along with a data signal. The forwarded clock signal enables the receiving device to synchronize with the transmitting device, enabling the receiving device to accurately sample the data signal transmitted by the sending device. The forwarded clock signal may be used directly by the receiving device to sample the received data, or may be used by the receiving device to generate a sampling clock signal with a proper sampling phase, which is the signal used by the receiving device to sample the received data signal. The sampling clock signal may have the same frequency as the forwarded clock signal, but may be shifted by a phase angle offset relative to the forwarded clocking signal to enable accurate sampling of the data signal. The phase range in which the shifted sampling clock signal may sample the received data correctly is referred to as the valid sampling phase range. An optimized sampling phase may be centered within the valid sampling phase range. At the receiving device, phase calibration of the sampling clock can be performed so that the data signal is sampled at an effective sampling phase with respect to the forwarded clock.

Even after a valid sampling phase range is determined, this sampling phase range may drift due to temperature variation and voltage variation. This may cause sampling errors if the sampling phase is not adjusted. By adjusting the sampling phase to account for drift, sampling errors can be avoided and thus the data rate of the bus can be increased.

To maintain a suitable sampling phase, embodiments of the present techniques use a known data pattern that is expected to appear in the data signal to periodically adjust the sampling clock. As explained further in the examples below, a known data pattern can be periodically sampled with a set of phases. If any phase drift arises due to temperature or voltage fluctuation, the sampling may result in sampling errors. Analysis of the sampling errors can indicate the direction and magnitude of the phase offset drift. The sampling phase can then be adjusted based on the direction and magnitude of the phase offset drift. By relying on a known data pattern, the disclosed technique does not rely on special training packets or calibration instructions to achieve phase calibration of the sampling clock. Furthermore, devices in accordance with the disclosed techniques do not rely on special clock data recovery circuitry to continuously track the phase offset drift, thus avoiding the additional power consumptions and implementation complexities involved in continuously tracking the phase offset drift.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

FIG. 1 is a block diagram of an example computing device with a bus interface that uses the phase tracking technique described herein. The computing device 100 may be, for example, a mobile phone, laptop computer, ultrabook, desktop computer, server, or tablet computer, among others. The computing device 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The processor 102 may be implemented as Complex Instruction Set Computer (CISC) or Reduced Instruction Set Computer (RISC) processors, x86 Instruction set compatible processors, multi-core, or any other microprocessor or central processing unit (CPU). In some embodiments, the processor 102 includes dual-core processor(s), dual-core mobile processor(s), or the like.

The memory device 104 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The memory device 104 can be used to store data and computer-readable instructions that, when executed by the processor, direct the processor to perform various operations in accordance with embodiments described herein.

The computing device 100 may also include a graphics processor 106 that processes computer generated graphics. The graphics processor 106 is configured to process memory related to the generation of graphics to be sent to a display 108. The display 108 may be a built-in component of the computing device 100 or externally coupled to the computing device 100.

The computing device 100 can also include a camera 110 configured to capture still images or video. Images or video captured by the camera 110 can be sent to various other components of the computing device 100, such as the display 108.

The computing device 100 may also include a storage device 112. The storage device 112 is a physical memory such as a hard drive, an optical drive, a flash drive, an array of drives, or any combinations thereof. The storage device 112 may also include remote storage devices. The computing device 112 may also include a network interface controller (NIC) 114 configured to connect the computing device 100 through to a network 116. The network 116 may be a wide area network (WAN), local area network (LAN), or the Internet, among others.

The computing device 100 may also include an input/output (I/O) device interface 118 configured to connect the computing device 100 to one or more I/O devices 120. The I/O devices 120 may include, for example, a printer, a scanner, a keyboard, and a pointing device such as a mouse, touchpad, or, touchscreen, among others. The I/O devices 120 may be built-in components of the computing device 100, or may be devices that are externally connected to the computing device 100.

Various additional components may be included depending on the design considerations for a particular implementation. For example, the computing device 100 may also include a memory controller hub that handles communications between the processor 102, memory 104, graphics processor 106, I/O device interface 118, and other components.

Communications between various components of the computing device 100 can be performed over one or more data busses 122. The busses 122 can include any type of data bus that sends and receives data in data packets and uses clock forwarding. At least one of the busses 122 may be D-PHY bus, a Mobile Industry Processor Interface (MIPI) D-PHY bus, or an M-PHY bus, among others. For example, the bus coupled to the camera 124 may be a multi-lane MIPI D-PHY bus used to transmit image data from the camera to other components of the computing device 100. Typical D-PHY technology can support a throughput of up to approximately 1.5 Gigabits per second (Gbps) per lane. As the imaging sensor technology continues to improve with regard to pixel density, this I/O throughput limitation has led to challenges in incorporating high-performance imaging sensors into computing platforms. The sampling phase tracking techniques disclosed herein can improve the throughput of the MIPI D-PHY bus, making it more suitable for use in high-speed camera interconnects or other imaging applications.

The bus architecture shown in FIG. 1 is just one example of a bus architecture that can be used with the techniques disclosed herein. In some examples, the data bus 122 may be a single bus that couples all of the components of the computing device 100 according to a particular communication protocol. Furthermore, the computing device 100 can also include any suitable number of data busses 122 of varying types, which may use different communication protocols to couple specific components of the computing device according to the design considerations of a particular implementation.

Each component of the computing device 100 includes a bus interface 124 for sending data to bus 122 and receiving data from the bus 122. Each bus interface 124 can operate as a transmitter, a receiver, or both. When transmitting data, the bus interface 124 sends data to a specified receiving device along with a forwarded clock signal. When receiving data, the bus interface 124 receives a forwarded clock signal from the sending device and generates a sampling clock signal from the forwarded clock signal by shifting the phase of the forwarded clocking signal by a phase angle offset, which enables accurate sampling of the received data signal.

To account for phase drift of the forwarded clock signal and maintain a suitable sampling phase, the phase angle offset can be periodically adjusted by the bus interface 122. As explained further below, the bus interface 122 can use different phase offsets to sample a known data pattern expected to occur in the received data signal. Analysis of any sampling errors that may occur can be used to determine how to adjust the phase angle offset.

It is to be understood that the block diagram of FIG. 1 is not intended to indicate that the computing device 100 is to include all of the components shown in FIG. 1. Rather, the computing device 100 can include fewer or additional components not illustrated in FIG. 1. Furthermore, the components may be coupled to one another according to any suitable system architecture, including the system architecture shown in FIG. 1 or any other suitable system architecture that uses a data bus to facilitate communications between components of a computing device. For example, embodiments of the present techniques can be implemented in any suitable electronic device, including ultra-compact form factor devices, such as System-On-a-Chip (SOC), and multi-chip modules. It could also be used on any electrical cable inside or outside of a computer that is used to carry digital information from one point to another.

Figure 2:
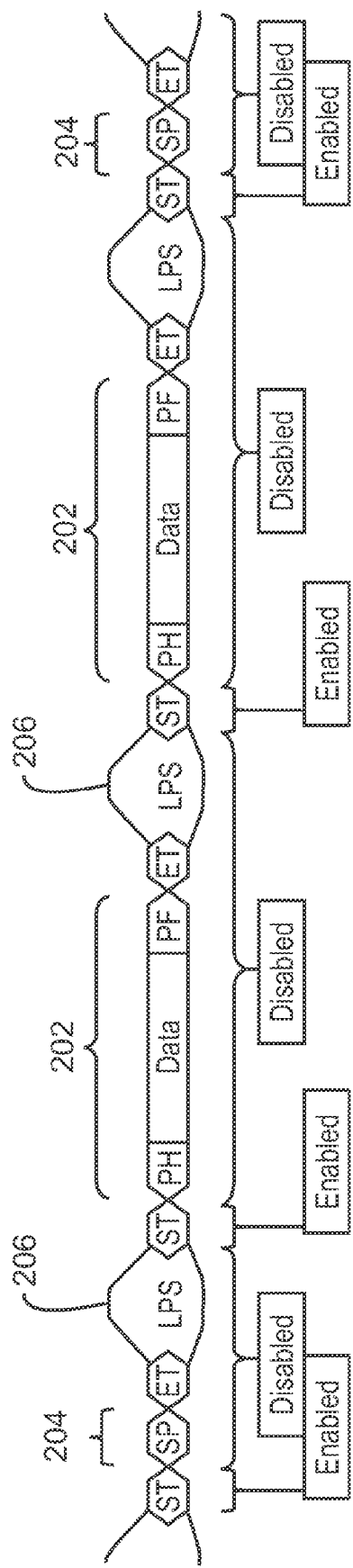
FIG. 2 is a timing diagram of an example of a data stream that may be received by one of the bus interfaces of FIG. 1.

FIG. 2 is a data stream in the time domain as an example using Mipi DPHY that may be received by one of the bus interfaces 122 of FIG. 1. The data stream 200 shown in FIG. 2 includes multiple packets, including long packets 202 and short packets 204. Each packet is separated by a Low Power State (LPS), which can be used for low power signaling. The transmission of a data stream begins with a transition from LPS to high-speed transmission state and the very first byte of the data stream is Start of Transmission (SoT) with a known value that indicates to the receiving device that a packets is about to be received. The transmission of the data stream may be typically periodical with LPS in between the data streams. For example, in applications where a video stream is recorded, a data stream may represent a whole image frame. In between each frames, there usually exists an blanking period where no data is transmitted. The link may be in LPS. This traffic behavior may result in periodic SoT transmission that may present an opportunity for SoT to be used for phase tracking. In some examples, the SoT signal can be used by the bus interface 122 of the receiving device as the known data pattern that is used to adjust the phase angle offset of the sampling clock signal. The bus interface 122 can include a phase tracking loop to sample the SoT signal and adjust the phase angle offset to maintain a suitable sampling clock signal.

As shown in FIG. 2, the phase tracking loop can be enabled upon detecting high-speed transmission. After completing the SoT sampling, the phase tracking loop can be disabled throughout the current data stream reception. It may remain disabled after the link enters LPS until the next data stream is received. Phase drift resulting from temperature or voltage changes may tend to occur slowly relative to the time it takes to start transmitting a new data stream. Thus, the phase angle offset determined for the sampling signal can be used reliably during the packet transmission with further adjustments. The operation of the phase tracking loop is explained further below in relation to FIGS. 3 and 4.

Figure 3:
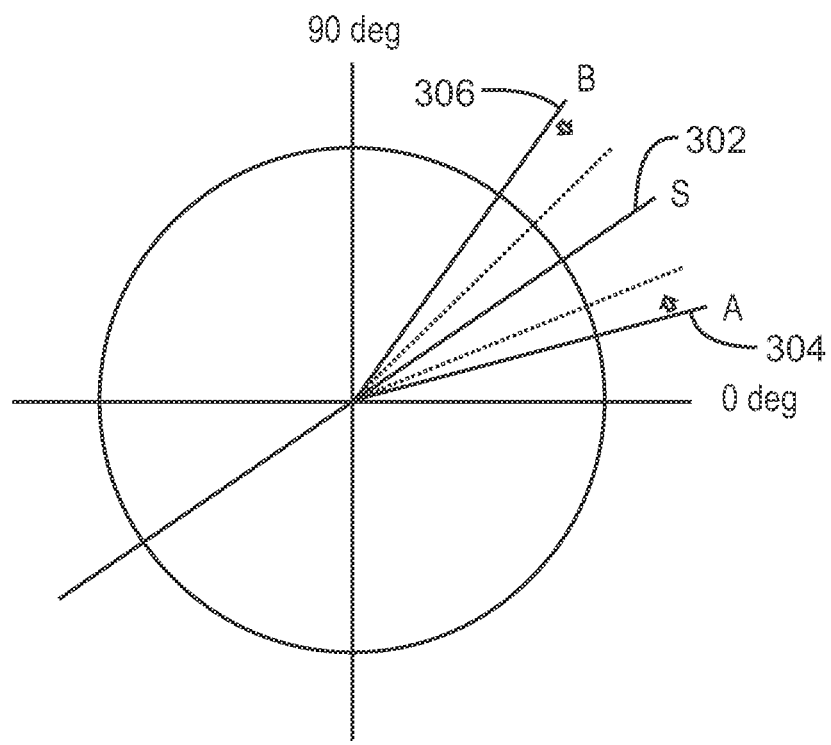
FIG. 3 is a polar plot illustrating a technique for identifying a suitable sampling phase.

FIG. 3 is a polar plot illustrating a technique for identifying a suitable sampling phase. In the polar plot 300, the angular coordinate represents the phase angle of one or more phase angle offsets used to sample data received by the bus interface. In the example shown in FIG. 3, line 302 represents the sampling phase used by the bus interface 122 to sample the received data. Line 304 and line 306 represent tracking phases, referred to herein as tracking phase A and tracking phase B, which are used to sample a known data pattern such as the SoT signal to determine the range of phases where the data stream maybe sampled correctly. Tracking phase A and tracking phase B are equidistant from the sampling phase. To help ensure that the sampling phase is effective, the known data pattern can be sampled at tracking phase A and tracking phase B. Any errors detected by tracking phase A and/or tracking phase B may be an indication of phase shift of the sampling phase. By analyzing the sampling errors, the bus interface can determine whether the sampling phase needs to be shifted. The sampling phase and tracking phases can then be adjusted so that the valid sampling phase range maybe adjusted accordingly and the sampling phase remains centered between the two tracking phases. In this way, the sampling phase remains centered as the best phase for sampling the data. For example, if the data sampled at tracking phase A has sampling errors and the data sampled at tracking phase B has no sampling errors, then it may be determined that the valid sampling phase range may be rotated counter-clock wise and the actual sampling phase may be adjusted counter-clock wise accordingly. Conversely, if the data sampled at tracking phase B has sampling errors and the data sampled at tracking phase A has no sampling errors, then it may be determined that the valid sampling phase range may be rotated clock wise and the adjustment of the actual sampling phase may be adjusted clock wise accordingly. In another rare situation, where sampling errors maybe observed at both tracking phases A and B, it may indicate the potential compression of the tracking range. Depending on the number of sampling errors at tracking phase A and tracking phase B, both the tracking phase A and the tracking phase B maybe adjusted closer to each other accordingly. And the sampling phase maybe adjusted accordingly.

In some examples, sampling errors may be observed at both tracking phases A and B, which may indicate that the tracking range should be compressed. Depending on the number of sampling errors at tracking phase A and tracking phase B, both the tracking phase A and the tracking phase B may be adjusted closer to each other accordingly, as indicated by the dotted lines. This may result in contraction of the valid sampling phase range. Conversely, if the data sampled for both tracking phases exhibits no sampling errors, and the tracking range is small, or the valid sampling phase contraction was performed before, the tracking phase A and the tracking phase B may be adjusted to test whether the range of the tracking phases may be expanded.

It will be appreciated that the diagram of FIG. 3 is presented merely as an example of the presently disclosed techniques, and that a particular implementation of the technique can include several variations. For example, in some implementations, there could be several tracking phases, such as four, six, or more tracking phases. In some examples, the phase tracking technique described in relation to FIG. 3 can be implemented by a phase tracking loop, as described below in relation to FIGS. 4 and 5.

Figure 4:
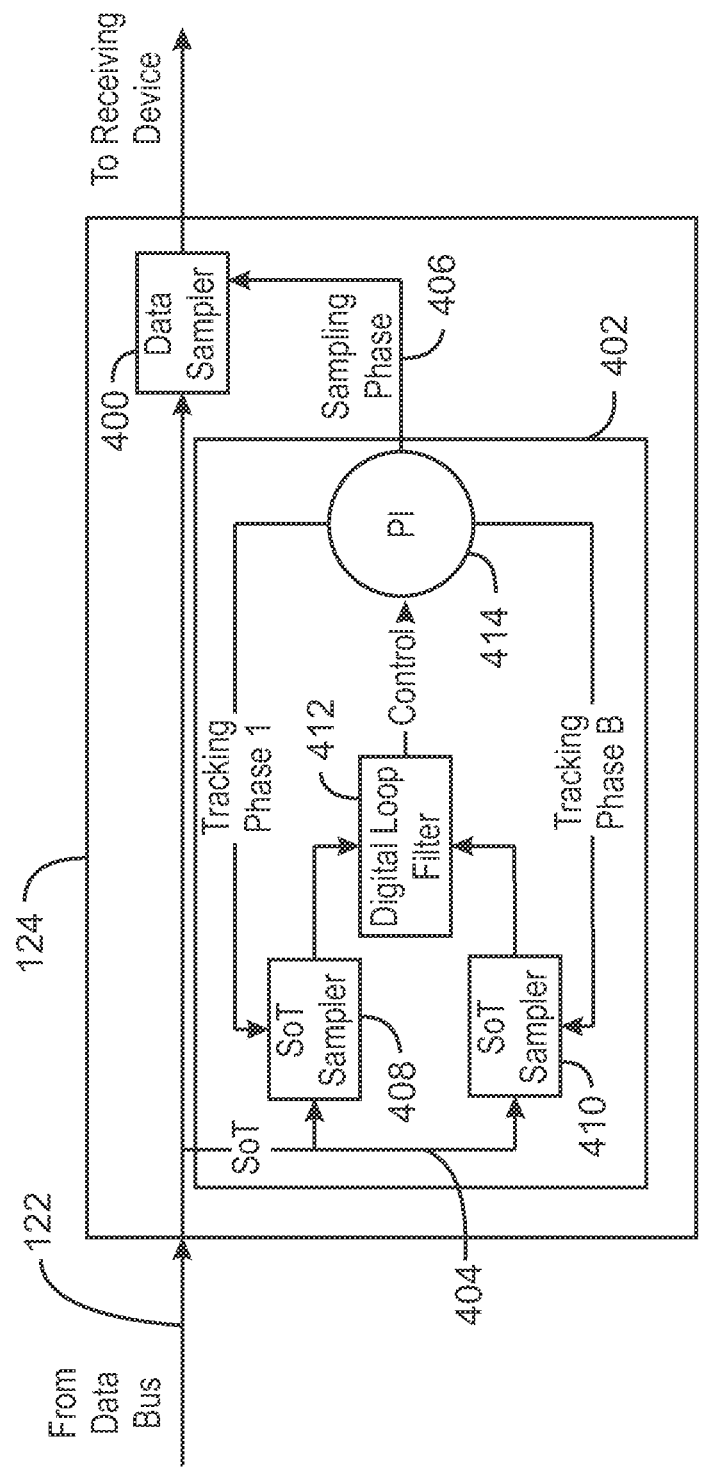
FIG. 4 is a block diagram of an example of a bus interface with a phase tracking loop.

FIG. 4 is a block diagram of an example of a bus interface with a phase tracking loop. The bus interface 124 includes a data sampler 400 and a phase tracking loop 402. The phase tracking loop 402 receives the SoT signal from the bus 124, determines a suitable phase angle offset, and sends the phase angle offset to the data sampler 400. The data sampler 400 receives the forwarded clock signal from the data bus and adds the sampling phase 406 to the forwarded clock signal to generate the sampling clock signal. The data sampler 400 then uses the sampling clock signal to sample the data signal received from the bus 122 and sends the resulting digital signal to the receiving device.

The phase tracking loop is used to determine, adjust and therefore, track the valid sampling phase range bounded by the tracking phase A and the tracking phase B, which are periodically tested and adjusted against a known pattern. This is accomplished by monitoring sampling errors based on tracking phase A and tracking phase B. If no errors are observed based on tracking phases A and B, no adjustment of the valid sampling phases range or the center sampling phase is necessary. If sampling errors are observed with either or both of the tracking phases, it may indicate the need for the valid sampling phase range adjustment and the center sampling phase adjustment. In the example shown in FIG. 4, the phase tracking loop 402 includes two SoT samplers 408 and 410, a digital loop filter 412, and a phase interpreter 414. The SoT sampler 408 uses tracking phase A to sample the SoT signal. The SoT sampler 410 uses tracking phase B to sample the SoT signal. The tracking phases A and B are received from the phase interpreter 414 and are defined to set a valid range of the tracking phases. The sampling phase 406 is centered in between tracking phase A and tracking phase B. Each SoT sampler 408 and 410 then counts the number of bit errors that it detects and sends the error count to the digital loop filter 412. The digital loop filter 412 tracks the bit error count from the two SoT samplers 408 and 410, and depending on the error statistics, the digital loop filter 412 sends a control signal to the phase interpreter 414 that indicates whether the sampling phase and the tracking phases need to be adjusted. In some examples, the error statistics performed by the digital loop filter 412 may subtract the bit error count received from the SoT sampler 408 (tracking phase A) from the bit error count received from SoT sampler 410 (tracking phase B) and identify the amount of sampling phase adjustment that the phase interpreter 414 may need to perform along with additional adjustment of tracking phase A and tracking phase B. The difference between the bit error counts indicates the direction in which the phase of the forwarded clock signal is drifting. For example, if the above bit error count difference is positive, then the bit error count for tracking phase A is higher. With reference to FIG. 3, a higher bit error count for tracking phase A would indicate that the phase of the forwarded clock signal has drifted higher.

The phase interpreter 414 performs sampling phase adjustment based on the control signal it receives from the digital loop filter 412. The adjusted sampling phase 406 is then sent to the data sampler 400. The phase interpreter also makes adjustment on the tracking phases based on the control signal, and sends the adjusted tracking phases to the SoT samplers 408 and 410.

The phase tracking loop 402 is implemented as hardware or a combination of hardware and programming instructions. For example, the phase tracking loop 402 can include logic circuits, such as latches, flip-flops, multiplexers, counters, and Boolean logic circuits such "AND" gates, "OR" gates, and inverters, among others. The phase tracking loop 402 can also include one or more processors configured to execute computer-readable instructions. In some examples, the phase tracking loop 402 is implemented as computer-readable instructions stored on an integrated circuit such as an Application Specific Integrated Circuit (ASIC), a Field Programmable Gate Array (FPGA), or other type of processor. In some examples, the phase tracking loop 402 is implemented as computer-readable instructions stored on a storage device and executed by a general purpose processor. Furthermore, the phase tracking loop 402 is one example of a device that can be used to adjust the sampling phase in accordance with the disclosed techniques.

Figure 5:
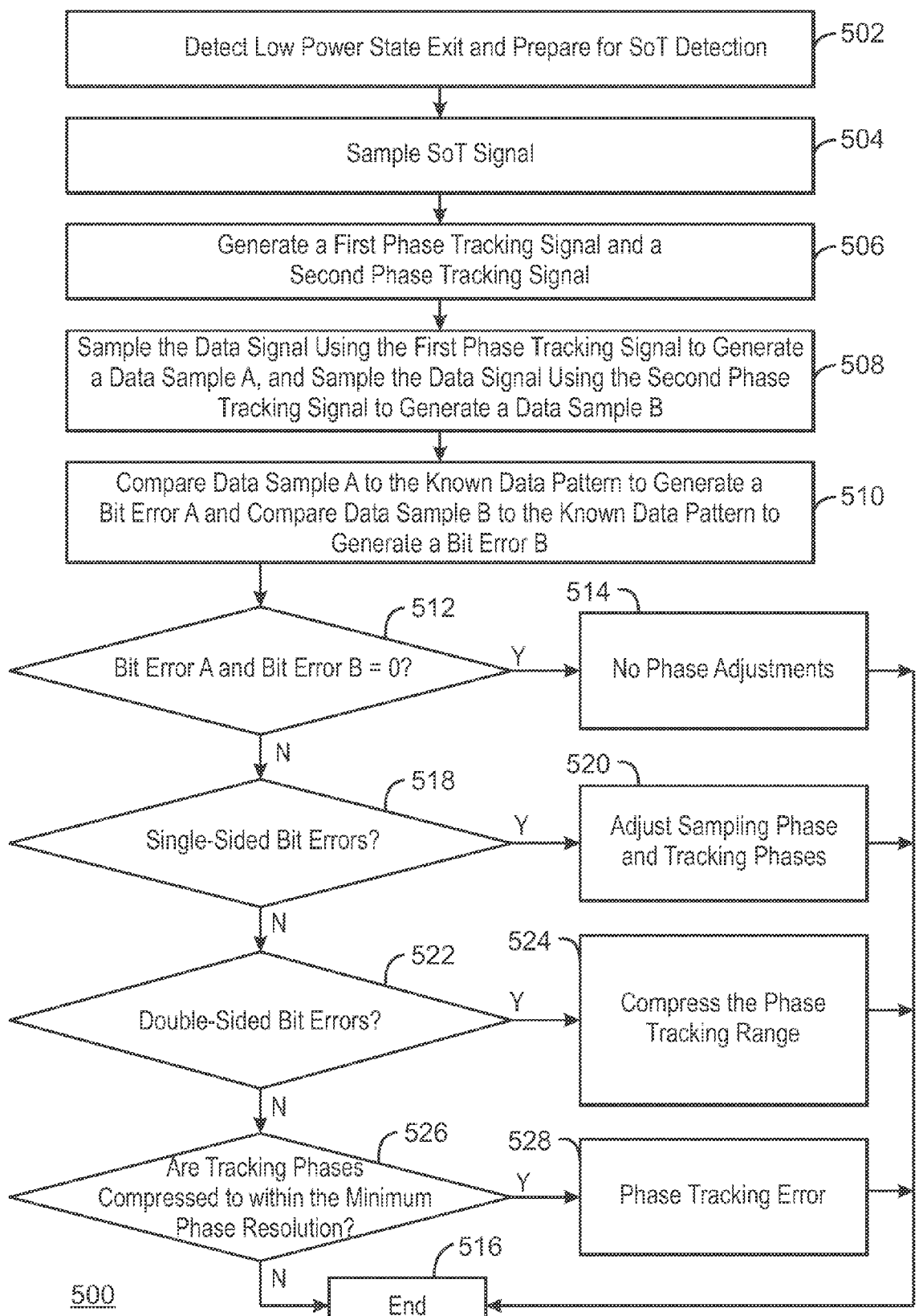
FIG. 5 is a process flow diagram of an example method to periodically adjust a sampling clock using phase tracking.

FIG. 5 is a process flow diagram of an example method to periodically adjust a sampling clock using phase tracking. The method 500 may be performed by the bus interface 124 and implemented by logic included in the bus interface 124. The logic is embodied in hardware, such as logic circuitry or one or more processors configured to execute instructions stored in a non-transitory, computer-readable medium.

At the start of the method 500, the forwarded clock signal is present on the bus and has already been received. In some examples, the initial sampling phase and tracking phases A and B may be determined based on initial training where an optimized sampling phase and its tracking phases maybe achieved after the training. In some examples, the initial sampling phase and tracking phases A and B may be preset sub-optimal, in which case the sampling phase is valid but there may be sampling errors with pre-assigned tracking phases A and B.

At block 502, the bus interface detects Low Power State (LPS) exit, wherein the bus leaves the LPS state. LPS will be initiated by the sending device when the sending device is preparing to send data packets in the High Speed (HS) state. After LPS exit, the bus interface prepares for Start of Transmission (SoT) detection.

At block 504, SoT sampling is performed. The SoT sampling begins as soon at the bus interface detects the presence of the SoT signal. The SoT signal triggers the start of the sampling phase adjustment routine of the bus interface.

At block 506, first and second phase tracking signals are generated. Each phase tracking signal will have the same frequency as the sampling clock signal but will have positive and negative phase angle offsets compared to the phase of the sampling clock signal. For the present description, the first tracking signal has lower phase angle compared to the sampling clock signal and the second tracking signal has a higher phase angle compared to the sampling clock signal. As explained above, the phase of the phase tracking signals will be equidistant from the phase of the sample clock signal.

At block 508, the data signal is sampled using the first and second phase tracking signals. The data signal is sampled during a portion of the overall data signal in which a known data pattern is expected to be received. In some examples, the known data pattern is the SoT signal described above. The data sample generated using the first tracking phase is referred to herein as data sample A, and the data sample generated using the second tracking phase is referred to herein as data sample B.

At block 510, the data samples obtained at block 508 are compared to the known data pattern. For each tracking phase, a bit error count is generated that represents the differences between the sampled data and the known data pattern. The bit error count for the data sampled using the first tracking phase is referred to herein as bit error A, and the bit error count for the data sampled using the first tracking phase is referred to herein as bit error B. The bit error counts can be analyzed to determine how to adjust the sampling phase and the tracking phases.

At block 512, a determination is made regarding whether bit errors are observed for the data sampled using the two tracking phases. If bit error A and bit error B are both equal to zero, this may indicate the actual sampling phase and the tracking phases are all within the valid sampling range and that no adjustment of the actual sampling phase or the tracking phases is needed. If bit error A and bit error B are both equal to zero, the process flow proceeds from block 512 to 514. At block 514, the actual sampling phase and the two tracking phases may remain unadjusted. Thus, no phase adjustment is performed, and the process flow advances to block 516. In some examples, a determination may be made at block 514 that in a previous cycle of the method 500, the tracking phase range was compressed. If the tracking phase range was compressed in a previous cycle, the tracking phase range may be expanded, in which case tracking phase A and tracking phase B may both be rotated away from the actual sampling phase by an equal amount. However, if the tracking phase range was not compressed in a previous cycle no phase adjustment is performed. In both examples, the process flow advances from block 514 to block 516.

At block 518, a determination is made regarding whether there are bit errors for only one of the tracking phases, a condition referred to herein as "single-sided" errors. For example, if bit error B is greater than zero and bit error A equals zero, or if bit error A is greater than zero and bit error B equals zero then single-sided errors are detected. If single-sided errors are detected, the process flow proceeds from block 518 to 520. At block 520, the sampling phase of the sampling clock signal is adjusted based on which tracking phase resulted in the bit errors. For example, with reference to FIG. 3, if bit error A is greater than bit error B, the sampling phase of the sampling clock signal is increased. However, if bit error B is greater than bit error A, the sampling phase of the sampling clock signal is reduced. Thus, the sampling phase is adjusted in a direction away from the tracking phase that resulted in the bit errors. The magnitude of the phase adjustment can be based on the phase resolution of the phase interpreter 414 (FIG. 4). Additionally, the phases of the two tracking signals can be adjusted by the same amount as the sampling phase. The process flow then proceeds to block 516 and the process ends.

At block 522, a determination is made regarding whether there are bit errors for both of the tracking phases, a condition referred to herein as "double-sided" errors. For example, if bit error A and bit error B are both greater than zero, then double-sided errors are detected. If double-sided errors are detected, the process flow proceeds from block 522 to 524. At block 524, the phase tracking range is compressed. To reduce the phase tracking range, the phase angle offset between the sampling signal and each phase tracking signal is reduced. For example, with reference to FIG. 3, tracking phase B would be reduced (rotated clockwise) and tracking phase A would be increased (rotated counter-clockwise). In some examples, a proportional phase adjustment to the tracking phases may be performed based on the numbers of errors detected at both sides. The process flow then proceeds to block 516 and the process ends.

At block 526, a determination is made regarding whether tracking phase A and tracking phase B are compressed to within the minimum phase resolution of the phase interpreter 414 (FIG. 4). If tracking phase A and tracking phase B are compressed to within the minimum phase resolution of the phase interpreter 414, this may indicate an error in the phase tracking process, and the process flow can proceed from block 526 to 528. At block 528, a phase tracking error is generated. In some examples, the phase tracking error may be recorded to an error log or reported to a user of the computing device. In some examples, the phase tracking error may be sent to the sending device through the bus. The process flow then proceeds to block 516 and the process ends.

The method 500 should not be interpreted as meaning that the blocks are necessarily performed in the order shown.

Furthermore, fewer or greater actions can be included in the method 500 depending on the design considerations of a particular implementation.

Some embodiments may be implemented in one or a combination of hardware, firmware, and software. Some embodiments may also be implemented as instructions stored on the tangible non-transitory machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

EXAMPLE 1

An example of an electronic device is described herein. The example electronic device includes a data bus, a transmitting device coupled to the data bus; and a receiving device coupled to the data bus by a bus interface. The bus interface is to receive a data signal from the transmitting device, wherein the data signal includes a known data pattern. The bus interface is also to receive a forwarded clock signal from the transmitting device and generate a sampling clock signal based on the forwarded clock signal. The bus interface is also to sample the known data pattern to obtain phase tracking data. The bus interface is also to adjust a sampling phase of the sampling clock signal based on the phase tracking data.

In some examples, the bus interface samples the known data pattern using a phase tracking signal, wherein a tracking phase of the phase tracking signal is offset from the sampling phase of the sampling clock signal by a phase angle. The phase tracking data may be a count of bit errors resulting from the sampling of the known data pattern by the phase tracking signal. The phase angle can be decreased if the count of bit errors is above a specified threshold. The phase angle can be increased if the count of bit errors is zero.

In some examples, to sample the known data pattern to obtain phase tracking data, the bus interface is to sample the known data pattern using a first phase tracking signal to generate a first bit error count, and sample the known data pattern using a second phase tracking clock signal to generate a second bit error count. The sampling phase of the sampling clock signal can be adjusted based on a comparison of the first bit error count with the second bit error count. For example, the phase angle range between the first phase tracking signal and the second phase tracking signal can be increased if the first bit error count and the second bit error are equal to zero. The phase angle range between the first phase tracking signal and the second phase tracking signal can be decreased if the first bit error count and the second bit error are both above a specified threshold.

In some examples, the known data pattern is a signal that indicates that a new packet is about to be received. The data bus may be a Mobile Industry Processor Interface (MIPI) D-PHY data bus. The transmitting device may be a camera. The electronic device may be a tablet or a smart phone.

EXAMPLE 2

An example of an electronic device is described herein. The example electronic device can include logic to receive a data signal from a transmitting device, wherein the data signal includes a known data pattern. The example electronic device can also include logic to receive a forwarded clock signal from the transmitting device and generate a sampling clock signal based on the forwarded clock signal. The example electronic device can also include logic to sample the known data pattern to obtain phase tracking data. The example electronic device can also include logic to adjust a sampling phase of the sampling clock signal based on the phase tracking data.

The logic to sample the known data pattern to obtain phase tracking data can include logic to generate a first phase tracking signal and a second phase tracking signal, logic to sample the data signal using the first phase tracking signal to generate a first data sample, logic to sample the data signal using the second phase tracking signal to generate a second data sample, logic to compare the first data sample to the known data pattern to generate a first bit error count, and logic to compare the second data sample to the known data pattern to generate a second bit error count.

In some examples, the logic to adjust the sampling phase of the sampling clock signal based on the phase tracking data includes logic to adjust a sampling phase of the sampling clock signal in a first direction if the first bit error count is higher than the second bit error count, and logic to adjust the sampling phase of the sampling clock signal in a second direction if the second bit error count is higher than the first bit error count. In some examples, the electronic device of includes logic to reduce the phase angle between the first phase tracking signal and the second phase tracking signal if the first bit error count and the second bit error count are both above a specified threshold. In some examples, the electronic device of includes logic to increase the phase angle between the first phase tracking signal and the second phase tracking signal if the first bit error count and the second bit error count are both zero.

EXAMPLE 3

An example of a communications interface is described herein. The example communications interface includes a data sampler to sample a data signal using a sampling clock signal, wherein the sampling clock signal is generated by phase shifting a forwarded clock signal by a phase angle offset. The example communications interface also includes a phase tracking loop. The phase tracking loop includes a first sampler to generate a first data sample by sampling a known data pattern, the first sampler to compare the first data sample to the known data pattern to generate a first bit error count. The phase tracking loop also includes a second sampler that uses a second phase tracking signal to generate a second data sample by sampling the known data pattern; the second sampler to compare the second data sample to the known data pattern to generate a second bit error count. The phase tracking loop also includes a phase interpreter to adjust the phase angle offset based on the first bit error count and the second bit error count and send the phase angle offset to the data sampler.

In some examples, the first sampler uses a first tracking signal to sample the known data pattern, and the second sampler uses a second tracking signal to sample the known data pattern, wherein the first tracking signal is offset from the sampling clock signal by a positive phase angle, and the second tracking signal is offset from the sampling clock signal by a negative phase angle that is equal in magnitude to the positive phase angle. The phase interpreter may increase the phase angle range between the first phase tracking signal and the second phase tracking signal if the first bit error count and the second bit error are equal to zero. The phase interpreter may also decrease the phase angle range between the first phase tracking signal and the second phase tracking signal if the first bit error count and the second bit error are both above a specified threshold.

In some examples, the known data pattern is signal that indicates that a new packet is about to be received. The communication interface can operate according to a Mobile Industry Processor Interface (MIPI) D-PHY data protocol. The data signal may be received from a camera. The communications interface may be included in a processor of a tablet or a smart phone.

What is claimed is:

1. An electronic device comprising:
   a data bus;
   a transmitting device coupled to the data bus; and
   a receiving device coupled to the data bus by a bus interface, the bus interface to:
      receive a data signal from the transmitting device, wherein the data signal includes a known data pattern;
      receive a forwarded clock signal from the transmitting device and generate a sampling clock signal, a first phase tracking signal, and a second phase tracking signal based on the forwarded clock signal, wherein the first phase tracking signal and the second phase tracking signal are separated by a phase angle range;
      sample the known data pattern using the first phase tracking signal to generate a first bit error count;
      sample the known data pattern using the second phase tracking signal to generate a second bit error count;
      adjust a sampling phase of the sampling clock signal based on a comparison of the first bit error count with the second bit error count;
      increase the phase angle range if the first bit error count and the second bit error are equal to zero; and
      decrease the phase angle range if the first bit error count and the second bit error are both above a specified threshold.

2. The electronic device of claim 1, wherein the bus interface samples the known data pattern using a phase tracking signal, wherein a tracking phase of the phase tracking signal is offset from the sampling phase of the sampling clock signal by a phase angle.

3. The electronic device of claim 2, wherein the phase tracking data is a count of bit errors resulting from the sampling of the known data pattern by the phase tracking signal.

4. The electronic device of claim 3, wherein the phase angle is decreased if the count of bit errors is above a specified threshold.

5. The electronic device of claim 3, wherein the phase angle is increased if the count of bit errors is zero.

6. The electronic device of claim 1, wherein the known data pattern is a signal that indicates that a new packet is about to be received.

7. The electronic device of claim 1, wherein the data bus is a Mobile Industry Processor Interface (MIPI) D-PHY data bus.

8. The electronic device of claim 1, wherein the transmitting device is a camera.

9. The electronic device of claim 1, wherein the electronic device is a tablet or a smart phone.

10. An electronic device, comprising:
    logic to receive a data signal from a transmitting device, wherein the data signal includes a known data pattern;
    logic to receive a forwarded clock signal from the transmitting device and generate a sampling clock signal based on the forwarded clock signal;
    logic to generate a first phase tracking signal and a second phase tracking signal based on the forwarded clock signal;
    logic to sample the data signal using the first phase tracking signal to generate a first data sample;
    logic to sample the data signal using the second phase tracking signal to generate a second data sample;

logic to compare the first data sample to the known data pattern to generate a first bit error count;

logic to compare the second data sample to the known data pattern to generate a second bit error count;

logic to adjust a sampling phase of the sampling clock signal in a first direction if the first bit error count is higher than the second bit error count; and logic to adjust the sampling phase of the sampling clock signal in a second direction if the second bit error count is higher than the first bit error count.

11. The electronic device of claim 10, comprising logic to reduce the phase angle between the first phase tracking signal and the second phase tracking signal if the first bit error count and the second bit error count are both above a specified threshold.

12. The electronic device of claim 10, comprising logic to increase the phase angle between the first phase tracking signal and the second phase tracking signal if the first bit error count and the second bit error count are both zero.

13. A communications interface comprising:

a data sampler to sample a data signal using a sampling clock signal, wherein the sampling clock signal is generated by phase shifting a forwarded clock signal by a phase angle offset; and a phase tracking loop comprising:

a first sampler to generate a first data sample by sampling a known data pattern, the first sampler to compare the first data sample to the known data pattern to generate a first bit error count;

a second sampler that uses a second phase tracking signal to generate a second data sample by sampling the known data pattern; the second sampler to compare the second data sample to the known data pattern to generate a second bit error count; and a phase interpreter to adjust the phase angle offset based on the first bit error count and the second bit error count and send the phase angle offset to the data sampler.

14. The communications interface of claim 13, wherein the first sampler uses a first tracking signal to sample the known data pattern, and the second sampler uses a second tracking signal to sample the known data pattern, wherein the first tracking signal is offset from the sampling clock signal by a positive phase angle, and the second tracking signal is offset from the sampling clock signal by a negative phase angle that is equal in magnitude to the positive phase angle.

15. The communications interface of claim 14, wherein the phase interpreter increases a phase angle range between the first phase tracking signal and the second phase tracking signal if the first bit error count and the second bit error are equal to zero.

16. The communications interface of claim 14, wherein the phase interpreter decreases a phase angle range between the first phase tracking signal and the second phase tracking signal if the first bit error count and the second bit error are both above a specified threshold.

17. The communications interface of claim 13, wherein the known data pattern is signal that indicates that a new packet is about to be received.

18. The communications interface of claim 13, wherein the communication interface operates according to a Mobile Industry Processor Interface (MIPI) D-PHY data protocol.

19. The communications interface of claim 13, wherein the data signal is received from a camera.

20. The communications interface of claim 13, wherein the communications interface is included in a processor of a tablet or a smart phone.

* * * * *